Sept. 6, 1949.　　　C. S. ASH　　　2,481,187
VEHICLE WHEEL

Filed May 19, 1945　　　3 Sheets-Sheet 1

INVENTOR
Charles S. Ash
BY Hobart N. Durham

ATTORNEY

Sept. 6, 1949.  C. S. ASH  2,481,187
VEHICLE WHEEL

Filed May 19, 1945  3 Sheets-Sheet 2

INVENTOR
Charles S. Ash
BY
Hobart N. Dunham
ATTORNEY

Patented Sept. 6, 1949

2,481,187

UNITED STATES PATENT OFFICE 2,481,187

VEHICLE WHEEL

Charles S. Ash, Milford, Mich.

Application May 19, 1945, Serial No. 594,758

6 Claims. (Cl. 301—64)

The present invention relates to vehicle wheels and more particularly to a wheel adapted to demountably carry a plurality of road engaging tires.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Fig. 4 is a cross-sectional view of the outer periphery of a modified embodiment of the wheel of the present invention.

It is an object of the present invention to provide an improved vehicle wheel for demountably mounting a plurality of road engaging elements as, for instance, a pair of conventional pneumatic tires. Another object is the provision of such a wheel that is of relatively simple construction so as to be economical to fabricate, but is strong enough to be of outstanding value for heavy duty work. The invention further provides a strong, light weight vehicle wheel of the type fabricated essentially of a hub and a pair of wheel carrying members extending radially outwardly from the hub which is cheaper and stronger than other wheels of the particular type.

With the stated and other objects in view there is provided in an illustrative embodiment of the invention as herein shown and described a substantially cylindrical hub to be rotatably mounted on the end of a vehicle axle, and a pair of web members secured at their inner peripheries to the hub in axially spaced apart relationship. The inwardly positioned web member is axially outwardly curved through its radial width nearer the hub, and radially outwardly is reversely curved to provide a scalloped bead for web strength and to provide a seat for a portion of the outer web. At its outer periphery the web member is abruptly inwardly curved to provide an integral annular inclined seat on which a tire rim of conventional type may be mounted.

The outer web member of the wheel terminates at its outer periphery in integral outwardly radially extending spoke portions. The web member directly radially beneath the spoke portions extends substantially in a plane perpendicular to the axis of the hub, with a slight outer axial curve at the bases of the spoke portions, so that the ends of the spoke portions are substantially axially spaced from the annular outer periphery of the inner web member. Plates are secured over the ends of the spoke portions and extend axially inwardly to the inner web member, providing seats for a tire rim for an outer tire of the dual assembly.

Between the spoke portions the outer web member is smoothly curved to form a scalloped periphery, and is axially inwardly curved at a substantial angle so that the curved periphery may lap and be secured to the scalloped bead of the inner web member. Spaced elliptical apertures may be provided in the inner web portion at places between those parts of the web which face spokes of the outer web member, in order to lighten the structure.

It will be understood that the foregoing general description and the following detailed description as well are exemplary and explanatory of the invention but are not restrictive thereof.

Figure 2:
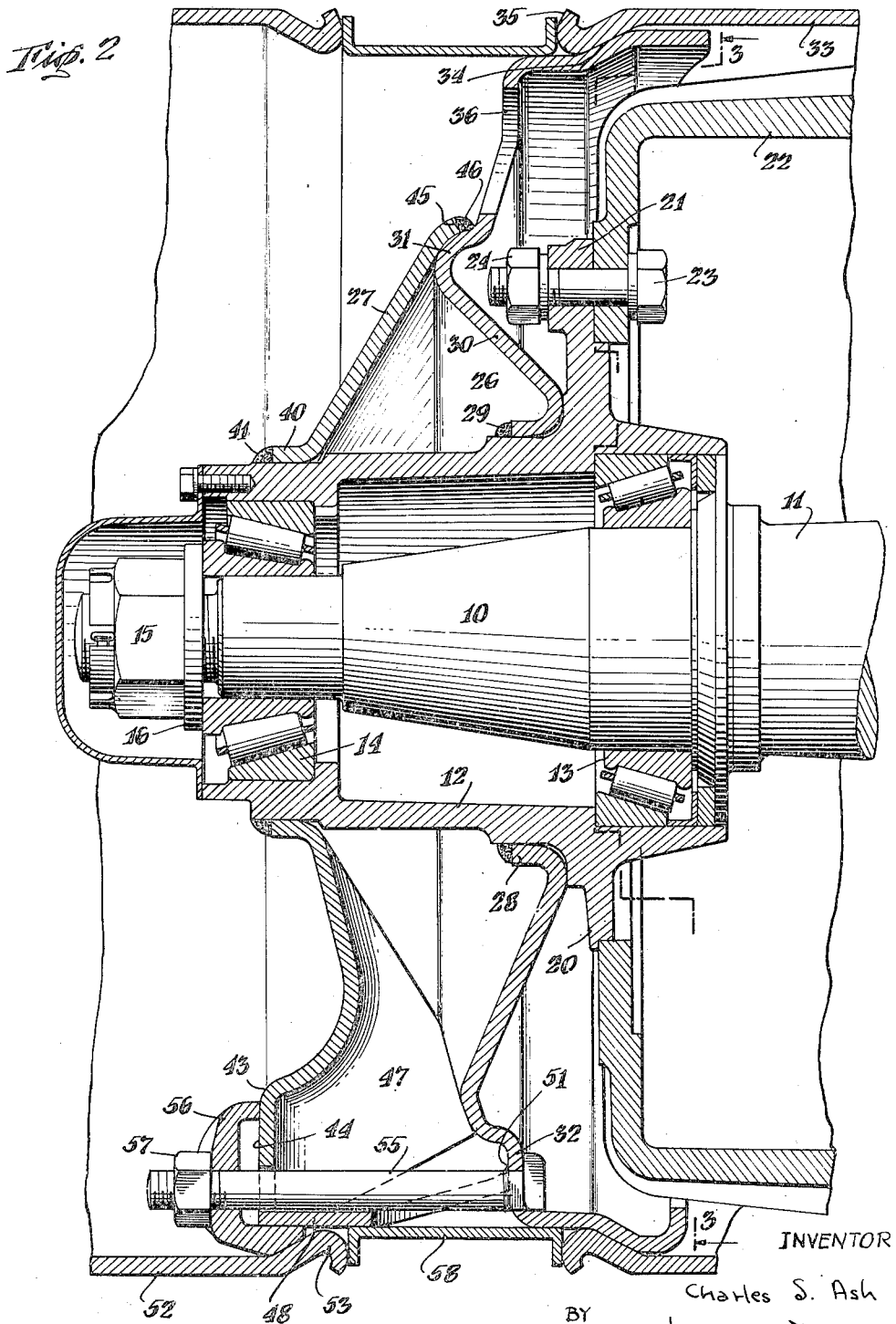
Fig. 2 is a cross sectional view taken along line 2—2 of Fig. 1.
Figure 3:
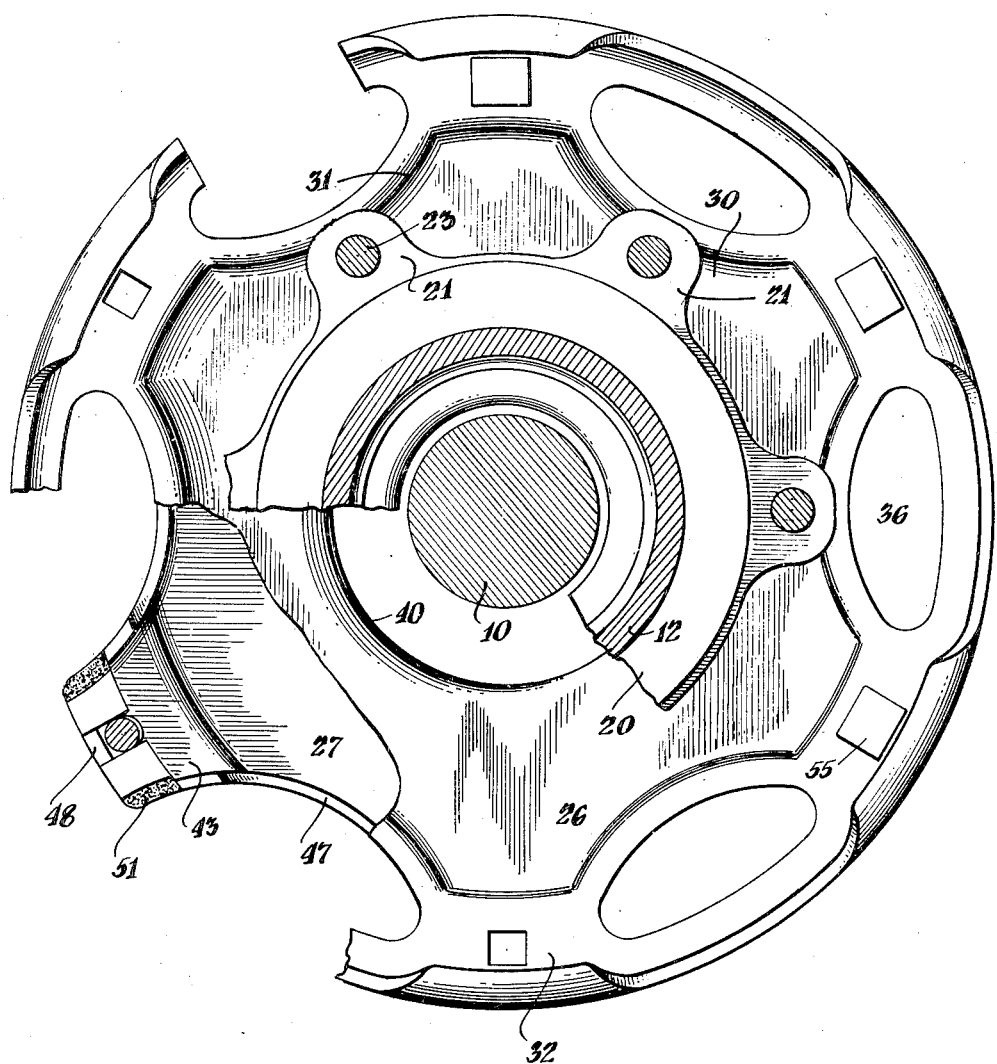
Fig. 3 is an elevational view of the vehicle wheel shown in Fig. 1 looking outwardly taken along line 3—3 of Fig. 2 certain parts being broken away.

Referring now in detail to the illustrative embodiments of the invention shown in the accompanying drawings, and referring particularly to Fig. 2, the vehicle wheel is shown as mounted on the reduced end or spindle 10 of a conventional trailing type vehicle axle 11. The wheel comprises an elongated hub member 12 mounted for free rotation on axle end 10 by means of roller bearings 13 and 14. The bearing and hub assembly is maintained in position by means of nut 15 and washer 16, as will be fully apparent to those skilled in the art.

Toward the inner end of the hub member 12 there is provided an outwardly radially extending integral flange portion 20 having thickened peripheral extensions 21 to which may be secured a brake drum 22 of any suitable type, for the wheel, being secured to the flange by means of bolts 23 and nuts 24.

The dual tire mounting means of the wheel comprise inner and outer web members 26 and 27 respectively, which may be formed by casting, pressing, or other suitable process. As clearly shown in Fig. 2, the inner web member 26 at its inner periphery is abruptly outwardly axially turned to form a substantially cylindrical portion 28 which seats on an external cylindrical surface of hub member 12, and a circular lap weld as at 29 securely joins the hub and web members. The cylindrical portion 28 has a very close and preferably a press fit on the hub 12 for maximum strength of assembly.

Figure 1:
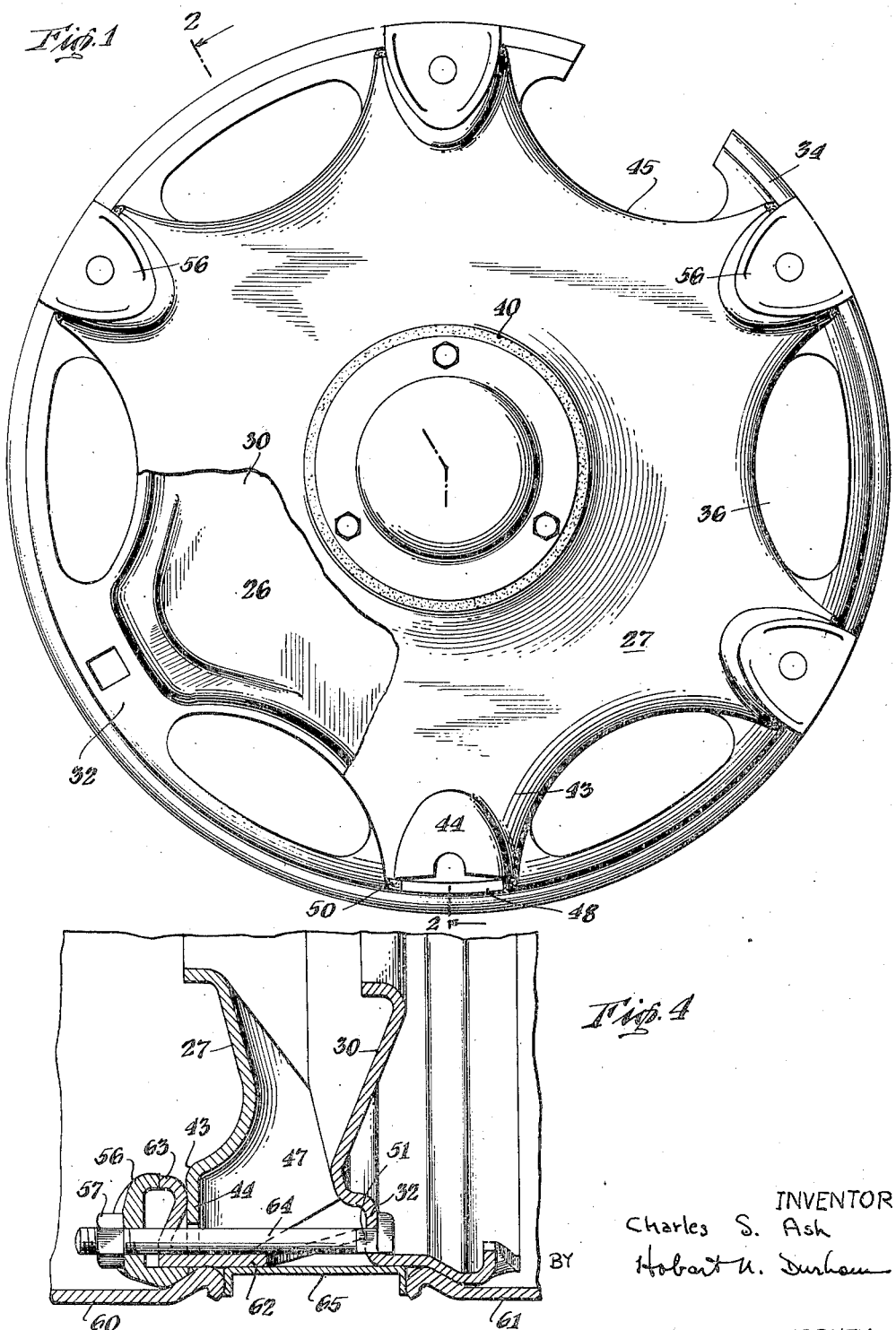
Fig. 1 is a side elevation viewed inwardly of a vehicle wheel embodying the present invention certain parts being broken away for greater clarity.

Radially outwardly of the cylindrical portion 28 the inner web member 26 is outwardly radially curved in its portion designated 30 in the drawings, and the annular curve between the portions 28 and 30 seats against a cooperatively curved surface of the hub at the base of its flange portion 20. The curved portion 30 of the web member terminates in a reversely curved bead 31, and, as may be seen in Fig. 1, this bead is of a scalloped form, extending in smooth curves nearer to and further from the periphery of the web member.

At the periphery of the inner web member 26 there are provided a plurality of spaced apart plane portions 32 having apertures to receive rim mounting bolts as hereinafter described, and these portions are positioned between adjacent curved lengths of bead 31. The web portion is abruptly inwardly axially turned at its outer periphery to provide a substantially cylindrical surface upon which a tire rim 33 may be seated. The surface may be outwardly flared toward its inner end to provide an inclined seat 34 for cooperation with an edge bead 35 of rim 33, this being a conventional form of pneumatic tire supporting rim. As shown, elliptical apertures designated by numeral 36 are provided between the plane portions 32 of web member 26, the apertures having as their lower edge the scalloped bead 31 and as their upper edge the annular rim supporting surface of the web. The provision of such apertures lightens the wheel and still allows a strong integral construction between the peripheral inner rim supporting portion of the wheel and the central body portion of the web member.

The outer web member 27 of the wheel for mounting a duplicate of tire rim 33 comprises an outwardly axially turned cylindrical portion 40 at its inner periphery which is preferably formed as a press fit with hub 12 and is seated thereupon. A circular lap weld 41 secures web member 27 to the hub in spaced apart relationship to the inner periphery of the other web member 26. At its outer periphery outer web member 27 terminates in a plurality of outwardly radially extending integral spoke portions 43 and at these portions the web extends in plane surfaces 44 which are substantially perpendicular to the axis of hub 12. Immediately radially beneath spoke portions 43 the web member curves axially inwardly somewhat and then reversely through a long curve to the cylindrical portion 40, as may be seen in the lower half of Fig. 2. Between spoke portions 43 the periphery of web member 27 is smoothly curved in scalloped segments and the body of the web is axially inwardly curved at a substantial angle from cylindrical portion 40 so that the scalloped edges 45 are brought adjacent to and lap the scalloped bead 31 of inner web member 26, and the web members are securely joined by curved lines of lap welding 46.

The spoke portions 43 of the outer web member 27 are strengthened by integral webs 47 at either side of plane surfaces 44 which extend in a substantially axial direction to the curved scalloped segments between the spoke portions. A plate member 48 is positioned over the end of each spoke portion 43 and extends inwardly to plane portions 32 of the inner web member. The plates are securely welded as at 50 along their edges to the ends of spoke portions 43 and at their inner ends as at 51 to the inner web member. The upper surfaces of the plates provide seats for the outer rim 52 which is preferably a duplicate of rim 33, having a turned edge or bead 53. The plates 48 also serve to securely join the spoke portions 43 to the inner web member strengthening the entire wheel structure. In this function they are supplemented by mounting bolts 55 which pass through apertures in plane portions 32 and 44 of the inner and outer web members respectively and carry conventional lugs 56 and nuts 57. Plates 48 are slotted along their inner axial portion to accommodate the bolts 55. An annular spacing ring 58 between rims 33 and 52 completes the demountable mounting means for the rims upon the wheel.

In the embodiment of the invention shown in Fig. 4 of the drawings the vehicle wheel is adapted to carry tires of greater road engaging area, in which case it becomes desirable to provide a wider spacing between the rims 60 and 61. The spoke end plates 62 of this embodiment of the invention are generally of the same configuration as those of the previously discussed embodiment, and similarly assembled, except that there is provided at their outer ends an inwardly radially turned integral portion 63. Portion 63 is curved as shown to seat against the plane portion of the spoke of the outer web member, to which it is welded as at 66, and to provide an axially disposed end to abut the lower prong of the rim mounting lugs. The lug bolt 64 of this assembly will be longer and the spacing ring 65 wider than those members in the embodiment of the invention already discussed.

The invention in its broader aspects is not limited to the specific mechanisms shown and described but departures may be made therefrom within the scope of the accompanying claims without departing from the principles of the invention and without sacrificing its chief advantages.

What I claim is:

1. A vehicle wheel comprising, in combination, a hub member, a pair of web members secured to said hub member in axially spaced apart relationship, the axially inner of said web members being axially outwardly curved and reversely curved in its body portion between said hub member and its outer periphery to form a curved scalloped bead, said inner web member terminating at its outer periphery in a substantially continuous integral annular rim mounting surface, the axially outer web member terminating at its outer periphery in integral outwardly radially extending spokes, the periphery of the axially outer web member being radially curved between said spokes and axially inwardly curved to lap said scalloped bead and being secured thereto, and means on said spokes for supporting a tire rim.

2. A vehicle wheel comprising in combination, a hub member, a pair of web members secured to said hub member in axially spaced apart relationship, the axially inner of said web members being axially outwardly curved and reversely curved in its body portion between said hub member and its outer periphery to form a curved scalloped bead, said inner web member terminating at its outer periphery in a substantially continuous integral annular rim mounting surface, said inner web having apertures therethrough between said bead and said rim mounting surface, the axially outer web member terminating at its outer periphery in integral outwardly radially extending spokes, the periphery of said outer web member being radially curved between said spokes and axially curved to lap said scalloped bead and being secured thereto, and means on said spokes for supporting a tire rim.

3. A vehicle wheel comprising, in combination, a hub member, a pair of web members secured to said hub member in axially spaced apart relationship, the axially inner of said web members having an integral annular substantially continuous tire rim mounting surface at its outer periphery, the axially outer of said web members terminating at its outer periphery in integral outwardly radially extending spokes, said outer web member being axially inwardly curved between said spokes and secured to said inner web member, and a plate secured to the end of each spoke having a radially outer rim mounting surface, said plates extending axially to said inner web member and being secured thereto.

4. A vehicle wheel comprising, in combination, a hub member, a pair of web members secured to said hub member in axially spaced apart relationship, the axially inner of said web members having an integral annular substantially continuous tire rim mounting surface at its outer periphery the axially outer of said web members terminating at its outer periphery in integral outwardly radially extending spokes, said outer web member being axially inwardly curved between said spokes and secured to said inner web member, and a plate secured to the end of each spoke having a radially outer rim mounting surface, said plates extending axially to said inner web member and being secured thereto, each said plate extending axially outwardly beyond said spokes and having a radially inwardly turned portion inwardly axially curved to contact its respective spoke and outwardly axially turned to provide a surface at its end substantially perpendicular to the axis of said hub member.

5. A vehicle wheel comprising, in combination, a hub member, a pair of web members secured to said hub member in axially spaced apart relationship, the axially inner of said web members terminating radially outwardly in an integral, substantially continuous, axially extending peripheral portion, said portion being formed with inclined rim mounting surfaces, the axially outer of said web members terminating at its outer periphery in integral outwardly radially extending spokes, said outer web member being axially inwardly curved between said spokes and secured to said inner web member, and means on said spokes for supporting a tire rim.

6. A vehicle wheel comprising, in combination, a hub member, a pair of web members secured to said hub member in axially spaced apart relationship, the axially inner of said web members being axially outwardly curved and reversely curved in its body portion between said hub member and its outer periphery to form a curved scalloped bead, said inner web member terminating radially outwardly in a substantially continuous peripheral portion, said portion being formed with rim mounting surfaces, the axially outer web member terminating at its outer periphery in integral outwardly radially extending spokes, the periphery of the axially outer web member being radially curved between said spokes and axially inwardly curved to lap said scalloped bead and secured thereto, and means on said spokes for supporting a tire rim.

CHARLES S. ASH.

REFERENCES CITED

The following references are of record in the file of this patent:

UNITED STATES PATENTS

| Number | Name | Date |
|---|---|---|
| 1,491,560 | Slick | Apr. 22, 1924 |
| 1,984,048 | Walther | Dec. 11, 1934 |
| 2,002,290 | Krieg | May 21, 1935 |
| 2,164,772 | Keller | July 4, 1939 |
| 2,406,068 | Frank | Aug. 20, 1946 |